United States Patent [19]
Hanson et al.

[11] Patent Number: 5,956,736
[45] Date of Patent: Sep. 21, 1999

[54] OBJECT-ORIENTED EDITOR FOR CREATING WORLD WIDE WEB DOCUMENTS

[75] Inventors: Michael Robert Hanson, Stanford, Calif.; John Lilly, Austin, Tex.

[73] Assignee: Apple Computer, Inc., Cupertino, Calif.

[21] Appl. No.: 08/719,710

[22] Filed: Sep. 27, 1996

[51] Int. Cl.[6] .................................................. G06F 17/21
[52] U.S. Cl. ........................... 707/513; 707/501; 345/339
[58] Field of Search ..................... 707/501, 512, 707/513, 514, 517, 526, 530; 345/326, 329, 333, 335, 339, 348

[56] References Cited

U.S. PATENT DOCUMENTS

| | | | |
|---|---|---|---|
| 5,724,595 | 3/1998 | Gentner ...................................... | 707/501 |
| 5,727,156 | 3/1998 | Herr-Hoyman et al. ........... | 395/200.49 |
| 5,758,351 | 5/1998 | Gibson et al. ........................... | 707/104 |
| 5,787,435 | 7/1998 | Burrows .................................... | 707/102 |
| 5,802,299 | 9/1998 | Logan et al. ........................ | 395/200.48 |
| 5,802,530 | 9/1998 | Hoff ......................................... | 707/513 |

OTHER PUBLICATIONS

Lemay, *Laura Lemay's Web Workshop:Microsoft FrontPage 97*, Sam.net, 1997, pp. 154–160 and 710.

Senna, "Web site authoring software Lots of extras in FrontPage 97", from http://www.infoworld.com/cgi–bin/display Archives.pl?dt_iwe41–96_80.htm, pp. 1–3, Oct. 7, 1996.

"LambdaMOO Programmer's Manual For LambdaMOO Version 1.7.6, Aug. 1993 Introduction" pp. 1–2, http://www.cs.reading.ac.uk/people/mkh/virtual_worlds/MOO/prog_manual/ProgrammersManual.texinfo_toc.html.

*Primary Examiner*—Stephen S. Hong
*Attorney, Agent, or Firm*—Blakely, Sokoloff, Taylor & Zafman

[57] ABSTRACT

An object-oriented HTML based editor for creating Web documents to be published on the World Wide Web. Each HTML command is treated as a unique object having associated properties. A user using an input device, such as a mouse, clicks and drags representations of objects representing HTML commands from a palette window on an output display device. The objects are dropped into a representation of a collection of objects in a view window on the output display device. Each one of the objects in the collection of objects may be edited by way of a context sensitive object editor window to customize the Web document. An object is selected by an input device and dragged to the object editor window, where the properties associated with the object are displayed and may be directly manipulated.

12 Claims, 17 Drawing Sheets

Line No.

```
1    <html><head><title>Demo.html</title
2    </head><body>
3    <h1>This is the header</h1>
4    This is some text.<P>
5    <HR>
6    <H2>12:21 PM, May 24, 1995</H2>
7    <b>12:21 PM, May 24, 1995</b>
8    </body>
9    </html>
```

OBJECT-ORIENTED EDITOR FOR CREATING WORLD WIDE WEB DOCUMENTS

FIELD OF THE INVENTION

The present invention relates to a computer mediated method and apparatus for editing and publishing a Web document, or Web "page" on the Internet's World Wide Web.

BACKGROUND OF THE INVENTION

The World Wide Web (the "Web") is a graphical hypertext-based interface that enables users to quickly move between Web sites and Web documents, also known as Web pages, on the Internet by following links to other Web documents or Web sites (Web pages) embedded within a Web document (Web page).

Creating a Web Document

A Web document may contain many forms of information, including text, graphics, video, audio, and links to other Web documents anywhere in the world. Presently, Hypertext Mark-up Language (HTML) is the standard format for documents on the World Wide Web. An HTML formatted document has HTML codes, i.e., commands, embedded in the document.

A software application known as a Web browser is used to access documents on the Web. By understanding HTML, Web browser software can properly display a Web document on a user's output display device. More importantly, Web browser software interprets the HTML commands in an HTML formatted Web document to navigate a link in that Web document to another Web document. The Web browser thereby provides automatic access to other Web documents on the Web.

A user with an understanding of HTML can create an HTML formatted Web document using any text editor software application, e.g., SimpleText, available from Apple Computer, Inc. SimpleText is a basic American Standard Code for Information Interchange (ASCII) text editor application. However, the user has to embed HTML "tags" in the Web document.

HTML tags are inserted at the appropriate locations in a Web document to inform a Web browser how to display the various kinds of information in the Web document. For example, FIG. 2 illustrates an HTML formatted document 200. The document is interpreted and displayed on a user's output display device using a Web browser such as Netscape Navigator', available from Netscape Communications, Inc. FIG. 3 shows the display 300 of the HTML document in FIG. 2 on an Apple Macintosh' computer system using Netscape Navigator' Web browser software.

HTML tags are typically paired. For example, the pair of tags "<html>" and "</html>" on lines 1 and 9 of FIG. 1 identifies the information contained between the tags as an HTML document. The HTML document is comprised of a header indicated by the pair of tags "<head>" and "</head>" on lines 1 and 2, and a body indicated by the pair of tags "<body>" and "</body>" on lines 2 and 8, respectively.

The pair of "<h1>" and "</h1>" on line 3 indicates a heading. Headings are numbered one through six, in order of decreasing font size. The text on line 4 ends with the end of paragraph tag "<P>". Upon detecting the end of a paragraph, a Web browser inserts a carriage return and a linefeed.

A horizontal rule tag, "<HR>", appears on line 5 of the HTML document. A Web browser inserts a horizontal line across the output display device upon encountering this tag. As can be seen from the example HTML document in FIG. 1, editing a very simple Web document using a plain editor requires an understanding of HTML and careful attention to syntax.

Tag-based editors, also known as HTML editors, were developed to provide HTML extensions. The HTML extensions allow a user to edit a document, select a segment of the document and choose an appropriate HTML tag from a pull down menu or the like to insert the HTML tags around the selected segment of the document. This obviates the need for a user to learn the specific keystroke sequences representing a given pair of HTML tags. However, there is still a significant difference between what the user sees in an HTML document such as illustrated in FIG. 1, and the corresponding display illustrated in FIG. 2. Thus, a certain level of user-sophistication and trial and error is required to generate a Web document as desired by the user. To that end, more recent HTML editors known as What You See Is What You Get (WYSIWYG) editors have been employed to generate Web documents.

WYSIWYG HTML editors, such as WebMagic, available from Silicon Graphics, Incorporated, FrontPage, available from Vermeer Technologies, Incorporated, and Adobe PageMill, available from Adobe Systems, Incorporated, simplify the task of creating a Web page by presenting the user's working page, i.e., a Web page being created by the user, as it would appear when accessed by a Web browser. In constructing the page, changes can be made by simple direct manipulation, as in a traditional word processor software application such as MacWrite, available from Claris Corp. WYSIWYG editors remove the need for users to correctly formulate the syntax and structure of a Web document and allow greater attention to be paid to the visual appeal and format of the final Web document.

WYSIWYG editors are quite limited, however, by several structural features of HTML and the Web. One limitation is that the range of Web browsers and platforms is as variable as the range of all computers, meaning that the visual presentation provided by a WYSIWYG editor will be appropriate for only a subset of the possible audiences of the document. A second limitation is that HTML is a rapidly evolving language with new features appearing every month, requiring expensive rewrites of WYSIWYG editors when major new features such as tables or frames appear. A third limitation is that WYSIWYG editors do nothing to expose the underlying programmatic structure of an HTML document. For these reasons, many intermediate and nearly all expert users of HTML produce their documents "in the raw" without using a WYSIWYG editor. Thus, what is needed is a method for creating Web documents that removes the need to understand HTML syntax while allowing the user to easily discern the format of the Web document as displayed on an output display device.

Publishing a Web Document

With reference to FIG. 8, a simplified model of the elements comprising the World Wide Web (the "Web") on the Internet is depicted. The Web 810 is a graphical, hypertext-based interface that overlays the Internet. The Internet is a collection of interconnected, autonomous data communication networks which spans the globe. A user at a computer system executing a Web browser software application such as Netscape Navigator can access information in the form of Web documents or pages on the Web. The information may reside on the same or different computer system or systems. This model is often referred to as a client-server computing model, in which one or more clients 810 and 820 access or query a server 830 over a data communications network.

A server on the Web serves, or publishes, Web documents over the Web. The documents are available to a user who accesses the server from a client executing Web browser application software. The server and client communicate using a communications protocol. Typically, a server and client communicate over a data communications network underlying the Web using an International Standards Organization (ISO) Open Systems Interconnection (OSI) Application-layer protocol such as HyperText Transfer Protocol (HTTP). The Application-layer protocol provides a method of communicating ASCII-based, HTML-formatted information comprising a Web document published by a server. The Web document is transmitted over a data communications network to a client upon request from the client. The HTTP protocol, as an Application-layer protocol, utilizes the services of a standard set of OSI Transport-layer and Network-layer data communication protocols such as the Transport Control Protocol/Internet Protocol (TCP/IP) suite of data communication protocols.

A client on the Web is comprised of a computer system executing Web browser application software. The client communicates with the server using HTTP, but must understand HTML as well, so that, among other things, upon receiving an HTML document from the server, the client knows how to display the document on an attached output display device.

As described above, HTML documents have traditionally been plain ASCII text files with HTML tags inserted at appropriate locations within the text file. The files are stored in a file system, as depicted in FIG. 9. FIG. 9 illustrates a traditional hierarchical file system 900 having a hierarchical directory structure 901 by which files, e.g., file A (902), are organized on a permanent storage medium such as a magnetic disk. File C 903 is a subdirectory containing files X, Y and Z. File Z 905 is a subdirectory as well for files 1, 2 and 3.

A server running the HTTP, i.e., an HTTP server, receives a request from a client for a particular HTML document. The HTTP server scans its file system directory 901 in search of the data file or files storing the HTML document. Upon locating the file or files in the file system, the HTTP server transmits the contents of the file using the HTTP. Thus, the HTTP server has no knowledge, and in fact, needs no knowledge, of the content or format of the HTML document to publish, i.e., transmit, the HTML document to the client over the data communications network.

A disadvantage in the above approach is that the contents of the HTML document are static. In other words, the contents of the HTML document do not change once created by an editor until such time as the document is directly modified by a user via an editor. To overcome this limitation, Common Gateway Interface Binary (CGI-bin) scripts were developed, which are essentially per, C or C++ computer programs that output HTML-formatted ASCII text at run time. CGI-bin scripts allowed a server to generate content within an HTML document "on the fly," i.e., dynamically, depending upon the current state of the server, e.g., the date or time of day, or input from a user. The information provided as input from a user could be information obtained from a client through an HTTP request, e.g., information regarding who or where the user is located, security or access control information, etc.

As opposed to HTML documents, HTTP servers do need to understand a CGI-bin script insofar as a server must know where the scripts are located, how to execute the scripts, and how to receive the information output by the script and convert the information, if necessary, to HTML format before transmitting it to a client over the data communications network.

One disadvantage of CGI-bin scripts is the level of user sophistication required to develop the scripts due to the computer program-like nature of the script language. Moreover, the scripts must be compiled, and are also limited in that they output ASCII text which must then be converted by the HTTP server or some other process to the appropriate format for a Web document, e.g., HTML format. Additionally, the scripts are created independent of each other, making it difficult and time-consuming to establish links between different CGI-bins scripts. What is needed is an object oriented-based authoring and serving environment wherein everything is treated as an object and an object can send messages to other objects or alter the serving environment itself. Finally, scripts cannot be easily extended and specialized like objects can. What is needed is a way for a user to take a certain object and create a specialized subclass that worked in exactly the same manner except for a different feature depending on the conditions.

SUMMARY OF THE INVENTION

The present invention provides an object-oriented HTML based editor for creating Web documents to be published on the World Wide Web. Each HTML command is treated as a unique object having associated properties. A user using an input device, such as a mouse, clicks and drags objects representing HTML commands from a palette window on an output display device. The objects are dropped into a collection of objects in a view window on the output display device. Each one of the objects in the collection of objects may be edited by way of a context sensitive object editor to customize the Web document. An object is selected by an input device and dragged to an object editor window, where the properties associated with the object are displayed and may be modified.

The present invention allows the Web page created by the object-oriented HTML based editor to be saved as an object rather than a data file in a file system. The object can then be published by a server on the Web as is, or the object can output its contents in a format requested by a client on the Web, e.g., an HTML formatted document.

It is a further object of the invention to provide a method for publishing a Web document having dynamic information, such that each time the Web document is published, the information is up-to-date. A script language allows a user to create or edit an output handler associated with an object to provide dynamic behavior.

The aforementioned and further objects, features and advantages of the present invention will be apparent from the description and figures which follow.

BRIEF DESCRIPTION OF THE DRAWINGS

The present invention is illustrated by way of example and not limitation in the following figures.

DETAILED DESCRIPTION OF THE PRESENT INVENTION

Introduction

The present invention provides an object-oriented HTML based editor for creating Web documents to be published on the World Wide Web (the "Web"). The present invention further provides a method by which the Web documents created by the object-oriented HTML based editor are published on the Web. In the following description, numerous specific details are set forth describing specific representations of data, specific processing steps, etc., in order to provide a thorough understanding of the present invention. However, it will be apparent to one of ordinary skill in the art to which the present invention pertains, or with which it is most nearly connected, that the present invention may be practiced without the specific details disclosed herein. In other instances, well known systems or processes have not been shown in detail in order not to unnecessarily obscure the present invention.

The present description includes material protected by copyrights, such as illustrations of graphical user interface images or text which the assignee of the present invention owns. The assignee hereby reserves its rights, including copyright, in these materials, and each such material should be regarded as bearing the following notice: Copyright Apple Computer, Inc. The copyright owner has no objection to the facsimile reproduction by anyone of the patent document or the patent disclosure, as it appears in the Patent and Trademark Office file or records, but otherwise reserves all copyrights whatsoever.

Computer Hardware

Figure 1:
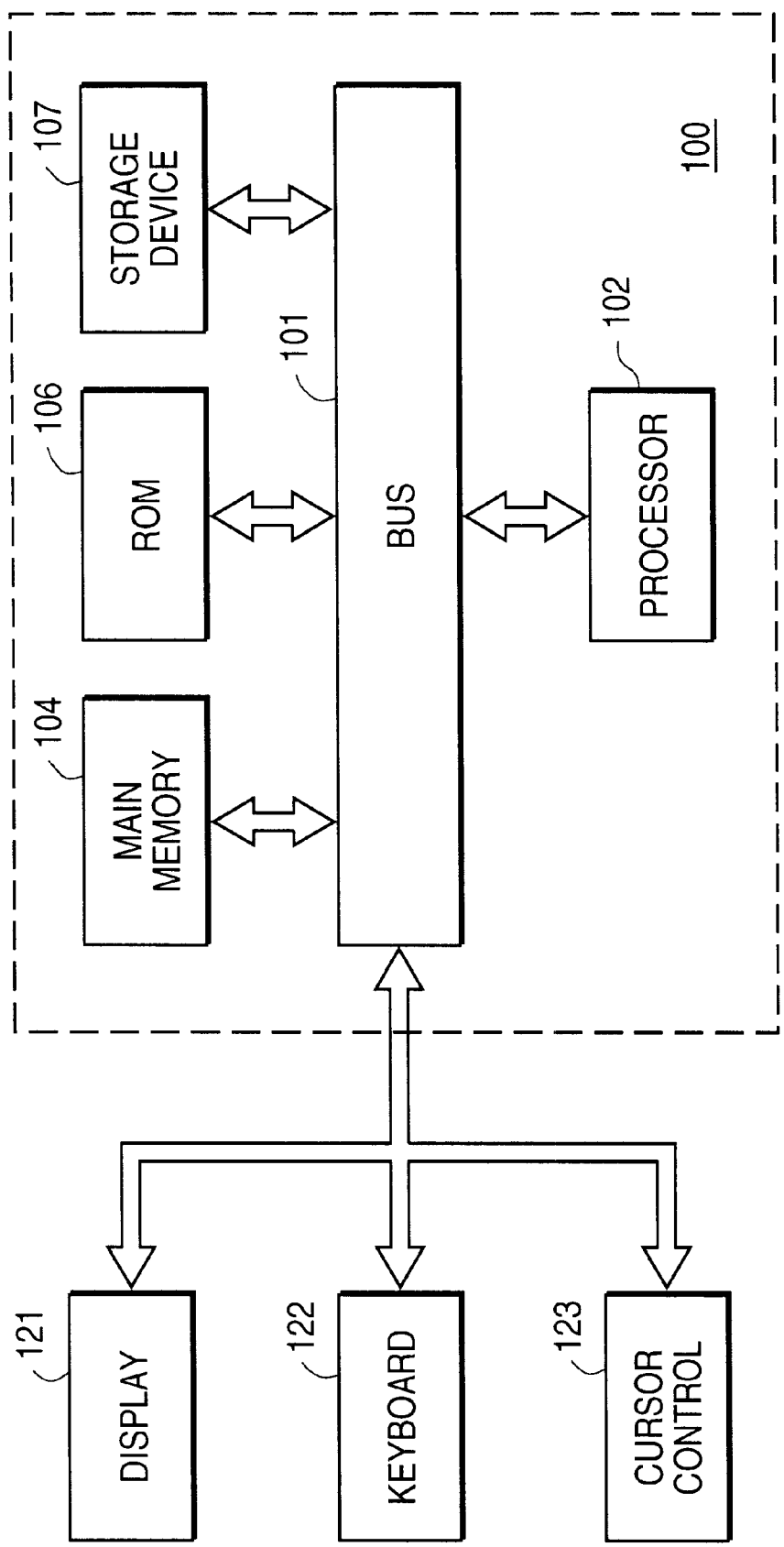
FIG. 1 illustrates a computer architecture upon which an embodiment of the present invention can be implemented.
Figure 2:
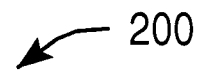
FIG. 2 is an example of an HTML-formatted Web document created using a plain text editor software application.
Figure 3:
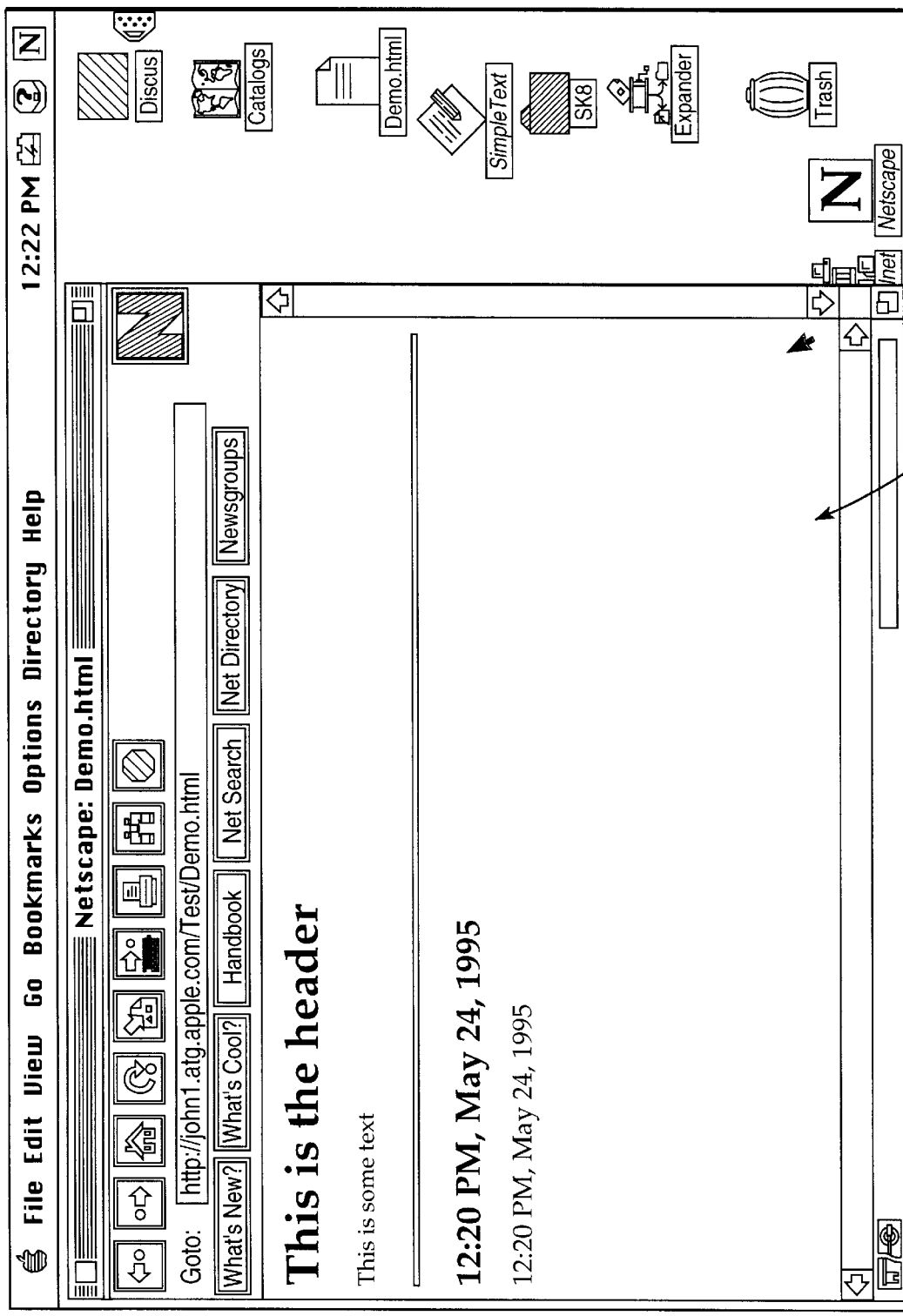
FIG. 3 illustrates a display of a Web document corresponding to the example Web document in FIG. 1.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to an output display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

Finally, in the currently preferred embodiment of the invention, computer system 100 is configured with a network interface card for coupling computer system 100 to a data communications network.

Object Oriented Editor

An embodiment of the present invention providing for an object oriented authoring environment for creating Web documents will now be described. The environment is comprised of an object system, object framework, script language, and a user interface.

Object System

The object system represents all data and procedures as objects. A character, for example, is a character object. An integer is an integer object. A project, e.g., a Web document, is an object. Each object has an associated set of properties and handlers. A property is storage space in an object. The storage has a name and holds exactly one value. In general, properties in an object oriented system are known as instance variables. A handler is a named segment of software code that is executed in response to a message, e.g., in response to an object informing another object to perform a function.

The object system is based on a prototype-based model where every object can be a template for creating new objects with different types of properties and handlers. In a prototype-based model, no distinction is made between an object and a template, i.e., all objects can be templates for other objects. In a prototype-based model, every object is a prototype, and every prototype is a type. Thus, each object is a type. The type represents the values of the properties and handler behavior associated with the object. Type is determined by inheritance from one or more parent objects. An object can refer to other objects. A property is an object reference. Objects can include other objects by reference. In fact, a property can include different types of objects at different times.

The object system provides support for many object, handler, and property related functions, including, but not limited to, adding or removing a property associated with an object, creating a child of an object, and duplicating an object.

Objects and their associated or inherited properties and handlers are organized into an object inheritance heterarchy where each object is the child of some other object. The structure is a heterarchy rather than a hierarchy due to the fact that an object can have more than one parent. The top object of the heterarchy is the object Object. Object contains all the handlers needed to create new objects or copies of objects, initialize objects, add or remove properties, assign object names, etc.

The object inheritance heterarchy lends itself well to HTML formatted Web documents which naturally have a hierarchical containment structure to them (e.g., an HTML document contains a head and a body, a body contains tables, headers, lists and paragraphs, a list contains list headings and list items, etc.) This property of containment is used heavily by the object oriented editor of the present invention, especially for the creation of custom objects created by the user.

The present invention also provides for the creation of a hierarchy of HTML objects which contain methods to 1) create appropriate HTML, 2) provide for an extensible and flexible list of attributes, and 3) create on-screen editor features. Additionally, the present invention provides for overriding any of these methods for any given object(s). The creation of a flexible and extensible list of attributes is useful so that if the protocol for HTML changes in the future (e.g., if future versions of HTML provide for horizontal rules to have an associated color), the user could easily make the required changes to the object oriented editor of the present invention without any need for a recompilation or redistribution of an HTML document by the developer. This also provides a user with the ability to take out unwanted features in an HTML document.

Concept of Objects, Properties, and Handlers

Objects are analogous to nouns in the English language. An object is a thing. Objects are defined in terms of other objects. An object is defined by the object's features and the object's relationship to its parents. The features of an object are its properties and handlers. An object can be a child of one or more parents. A child inherits the features of its parent(s). Since a parent object inherits the features of its parents, the child inherits the features of its ancestors.

An example of an object is the HTML horizontal rule (HR). The object HR can be used to store information about horizontals rules in a Web document. Thus, the object HR has properties associated with it such as width, size, alignment, and shading. Each of these properties, in turn, can have a value, e.g., width=100%, alignment=center, etc.

The object HR can be enriched by defining a handler for it that makes some use of the information associated with the object.

Properties are analogous to adjectives in the English language. A property is storage space in an object. This storage has a name and can hold exactly one value. This value can be anything ranging from a Boolean value to a collection of values including a list, an array, or any kind of object.

Handlers are similar to verbs in the English language. The behavior of and operations performed on objects are controlled by handlers. A message handler, or simply, handler, is a named piece of software code that is executed in response to a message or event. Handlers are procedures available to an object that specify some action to be performed. A handle is the name of a behavior that the object is asked to perform.

Object Framework

The Object Framework provides a set of objects for developing Web documents. The framework provides objects that represent files, Input/Output (I/O) devices, sounds, shapes, dates, clocks, etc., i.e., objects that abstract away particulars of a computer operating system and hardware upon which the Web document is created and published. In addition, objects are provided for low level graphics and much higher level aspects of graphics, including objects for traditional data types such as integers, characters, strings, as well as arbitrary collections of objects, arrays, list and vectors, objects that handle errors and events, and user interface objects such as buttons and scrollers.

Script Language

A script language is provided by an embodiment of the present invention. The script language is a complete object oriented programming language for writing, compiling, and executing handlers, obviating the need to develop the handlers in lower-level code. Because the script language is an object oriented language, script code is associated with an object. Such code is called a 'functional-handler', or simply, handler. Each handler is owned by exactly one object. New objects are created from existing objects. By default, a new object shares, or 'inherits' all the handlers owned or inherited by the objects it is created from, i.e., the object's parents.

User Interface

A user interface, termed Project Builder, provides for general purpose direct manipulation of a user project, e.g., for developing a Web document. The Project Builder provides a variety of object and script language browsers and editors. A user project is the workspace in which a user develops a Web document. The process of building a Web document consists of the general steps of designing a user interface for the Web document, customizing the interface by changing properties and scripting the interface to provide a certain behavior, experimenting with the look and feel of the interface, and finally, continuing with a more detailed implementation of the Web document's functional requirements.

User Interface Windows

In one embodiment of the present invention, The Project Builder interface has windows that are characterized by an appearance similar in design to the Apple Macintosh computer system, but distinct enough to avoid confusion with the Web document a user is creating.

In many of the windows, there are multiple panels in which a user can type. The field which is highlighted in white is the active typing field. If the window is not selected, all panels therein are gray. When the window is active, one of the panels is white to indicate that any keystrokes will be sent to this panel. Within any window, the Tab key changes focus from one panel to another panel.

The Project Builder interface supports drag and drop operations. A user can use an input device such as a mouse to click on, then drag and drop references to objects, properties, and handlers between the various windows, editors and browsers. For example, as will be described with reference to a specific example below, a user can click on a particular object for a period of time, such as half of a second, and a gray box appears around the name of the object. The box can be dragged to a field in an editor or window and dropped there to cause the editor or window to focus on this object. Indeed, several objects can be selected, dragged and dropped in this manner, for example, by simultaneously holding down the shift key on a keyboard while clicking on the objects with an input device such as a mouse. It should be noted that the user is not dragging the actual objects around, only references to the objects. Dragging a reference around will not affect the object.

Throughout Project Builder, an item can be selected and the delete key pressed to remove it. For example, a user can select a handler and press the delete key to remove the handler. In the same manner, the user can delete properties, handlers, functions, constants and variables. Objects can be removed in the same way, provided there is not a reference to the object.

Many of the Project Builder windows are designed to provide a user with context sensitive information. A description of the various windows that appear on output display device 121 follows.

Message Box Window

Figure 4:
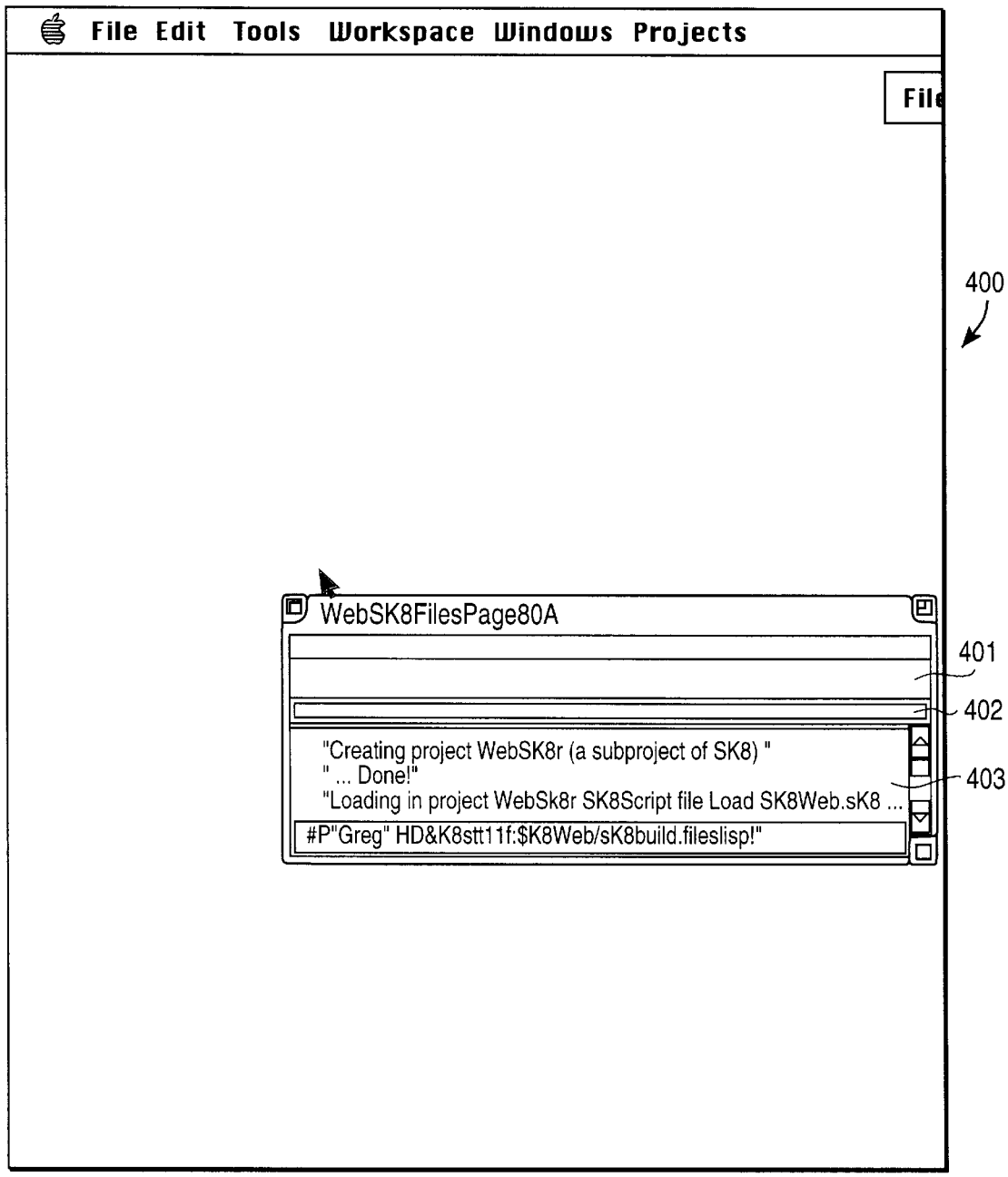
FIG. 4 illustrates a message box window as may be utilized by an embodiment of the present invention.

With reference to FIG. 4, the Message Box window 400 provides a window in which to type script commands and receive system messages. The Message Box window 400 is comprised of a listener panel 401, panel splitter 402 and display panel 403. The listener panel 401 is a script command line interface that allows a user to communicate with the Project Builder interface by typing into it. When the Return or Enter key is pressed, the listener panel 401 evaluates the script command typed therein and responds in the display panel 403. Panel splitter 402 separates listener panel 401 from display panel 403.

Display panel 403 displays messages from the object oriented editor of the present invention. The display panel 403 provides responses to commands entered into the listener panel 401. Display panel 403 also provides status information during the execution of certain operations, such as saving or loading a Web document.

HTML Palette Window

Figure 5A:
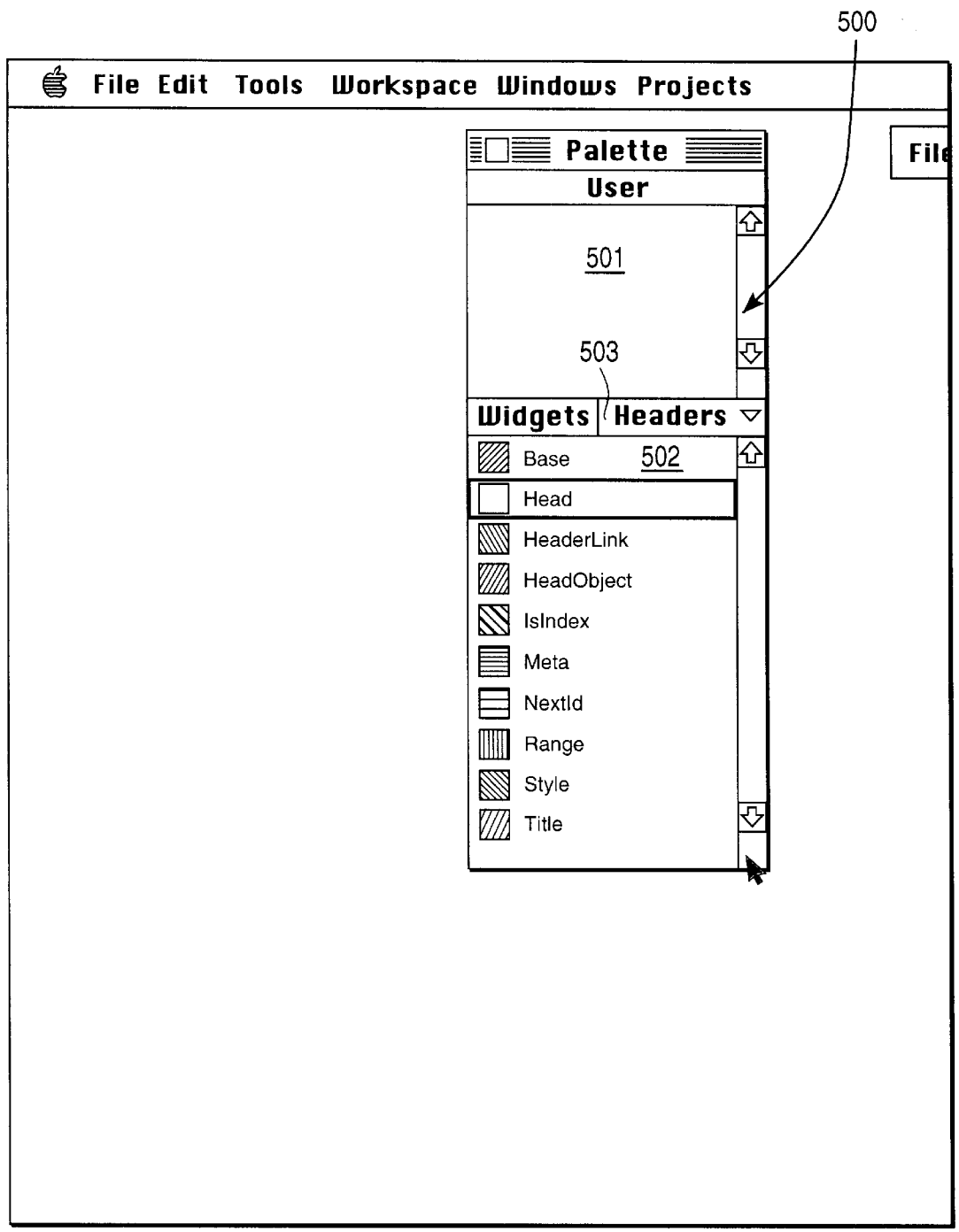
FIG. 5A illustrates a palette window as may be utilized by an embodiment of the present invention.
Figure 5B:
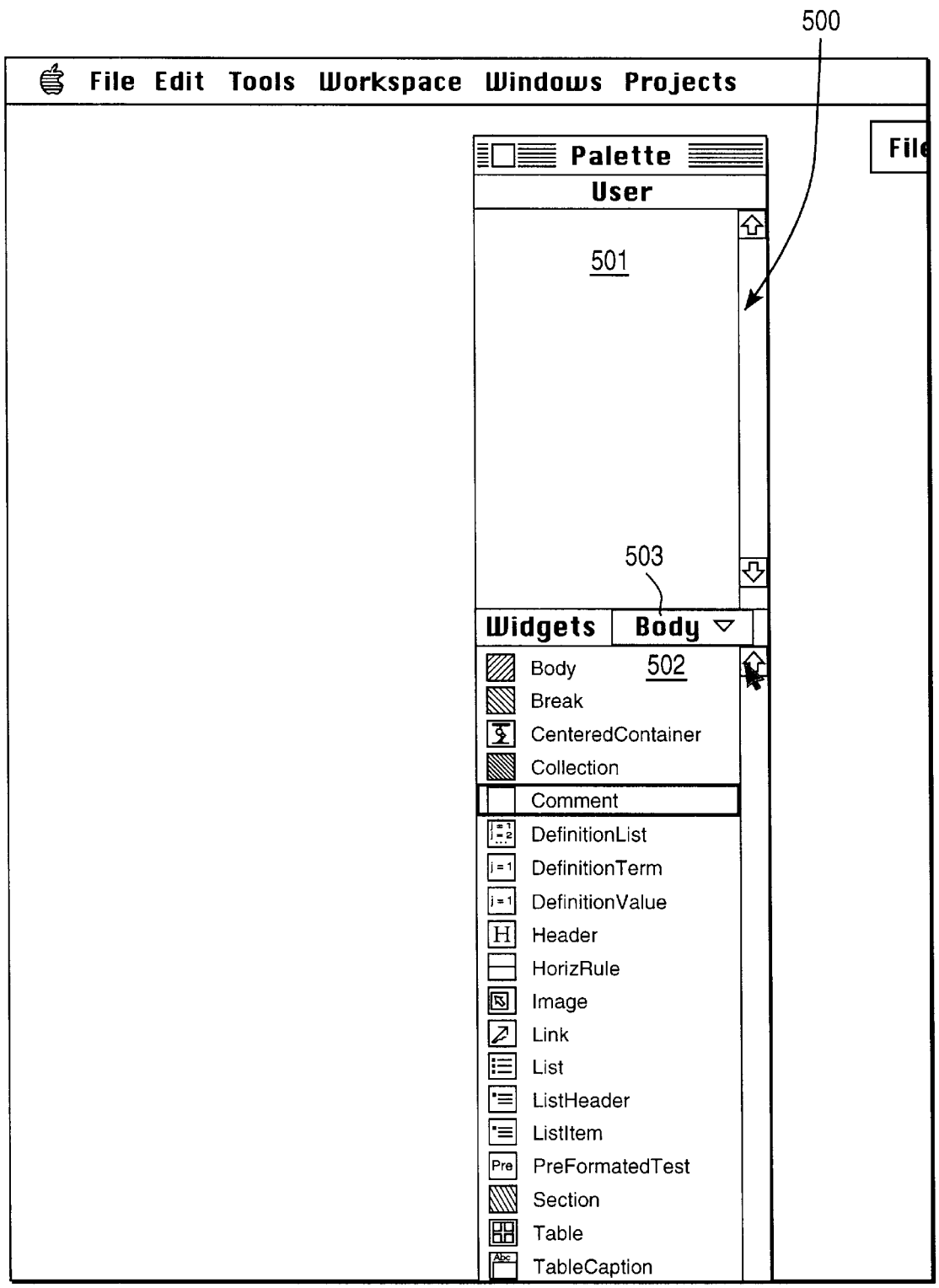
FIG. 5B illustrates a palette window as may be utilized by an embodiment of the present invention.

FIGS. 5A and 5B illustrate the HTML Palette window 500. The HTML Palette window 500 has two panels: user panel 501, and widgets panel 502, which may display different libraries of predefined HTML objects, such as the library of HTML header objects illustrated in FIG. 5A, or the library of HTML body objects illustrated in FIG. 5B. To select an object in either of the panels, a user clicks on the object. To switch between the library of HTML header objects and the library of HTML body objects, a user pulls down on the pull down menu 503 at the top right corner of the widgets panel 502.

The user panel 501, although illustrated as empty in FIGS. 5A and 5B, displays new user-defined HTML objects created by the user. It is possible to drag and drop an HTML object from widgets panel 502 to user panel 501. The user may first choose to modify a predefined HTML object from widgets panel 502, rename it, and store it in user panel 501.

The predefined HTML object is modified by the user first dragging the HTML object to an object editor window, as described in more detail below. This allows a user to reuse a predefined HTML object, such as a header, by modifying a property or handler associated with the predefined HTML object, and creating a new user-defined HTML object that is identical to the predefined HTML object with the exception of the modified property or handler. This ability is fundamental to the concept of software reuseability in object oriented programming. The ability to click and drag on a predefined object for the purpose of reusing the object to create custom objects provides for efficient construction of Web documents. For example, the object oriented editor of the present invention provides for the creation of a custom user object, such as an object named EmployeeInfoObject, which comprises a table containing the objects: employee name, picture, and employment date. Once the object EmployeeInfoObject is created, a user can click on the object and drag it to the user palette where copies can be made for each employee, without regard for or an understanding of the structure of the object.

HTML Page Viewer Window

Figure 6A:
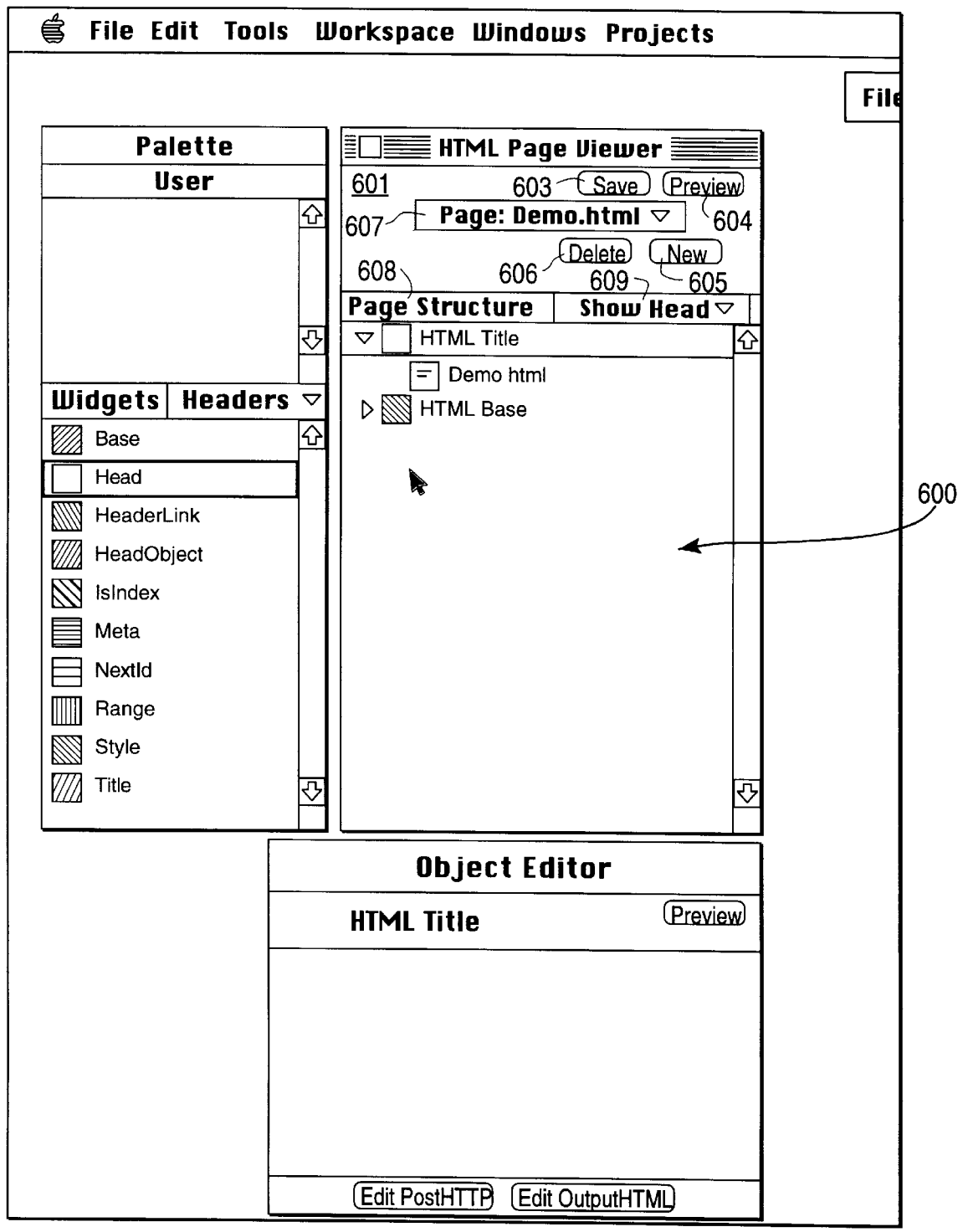
FIG. 6A illustrates a Web page viewer window as may be utilized by an embodiment of the present invention.

With reference to FIG. 6A, an embodiment of the present invention provides an HTML Page Viewer window 600 (the "viewer window") via which a user can create and display a representation of a collection of HTML objects comprising a Web document (i.e., Web page). The Page Viewer window 600 is comprised of a title panel 601 and a page structure panel 608. Title panel 601 displays at pull down menu 607 the title of the page whose structure appears in page structure panel 608. A user can use an input device such as a mouse to pull down on pull down menu 607 to select from a number of Web pages. A representation of the collection of objects comprising the Web page selected is then displayed in page structure panel 608 of the viewer window.

Save button 603 saves the current Web page into the user project. Preview button 604 previews the current Web page by sending an interprocess communication signal to a concurrently running Web browser, e.g., Netscape Navigator, available from Netscape Communications. When previewing a Web page, the page is rendered into text, saved into a temporary file on a permanent storage medium and passed to a Web browser with instructions to open the temporary file and display it in a window on an output display device, for example, the same output display device on which the windows of the object editor of the present invention are being displayed. Indeed, a user often positions the Web browser window along side the object editor window, thereby allowing side-by-side editing and previewing. By using separate Web browser application software, the present invention allows the user to try out a Web page with any Web browser. Additionally, New button 605 creates a new Web page, wherein the user is prompted for a Web page name. Finally, Delete button 605 deletes the current Web page.

Figure 6B:
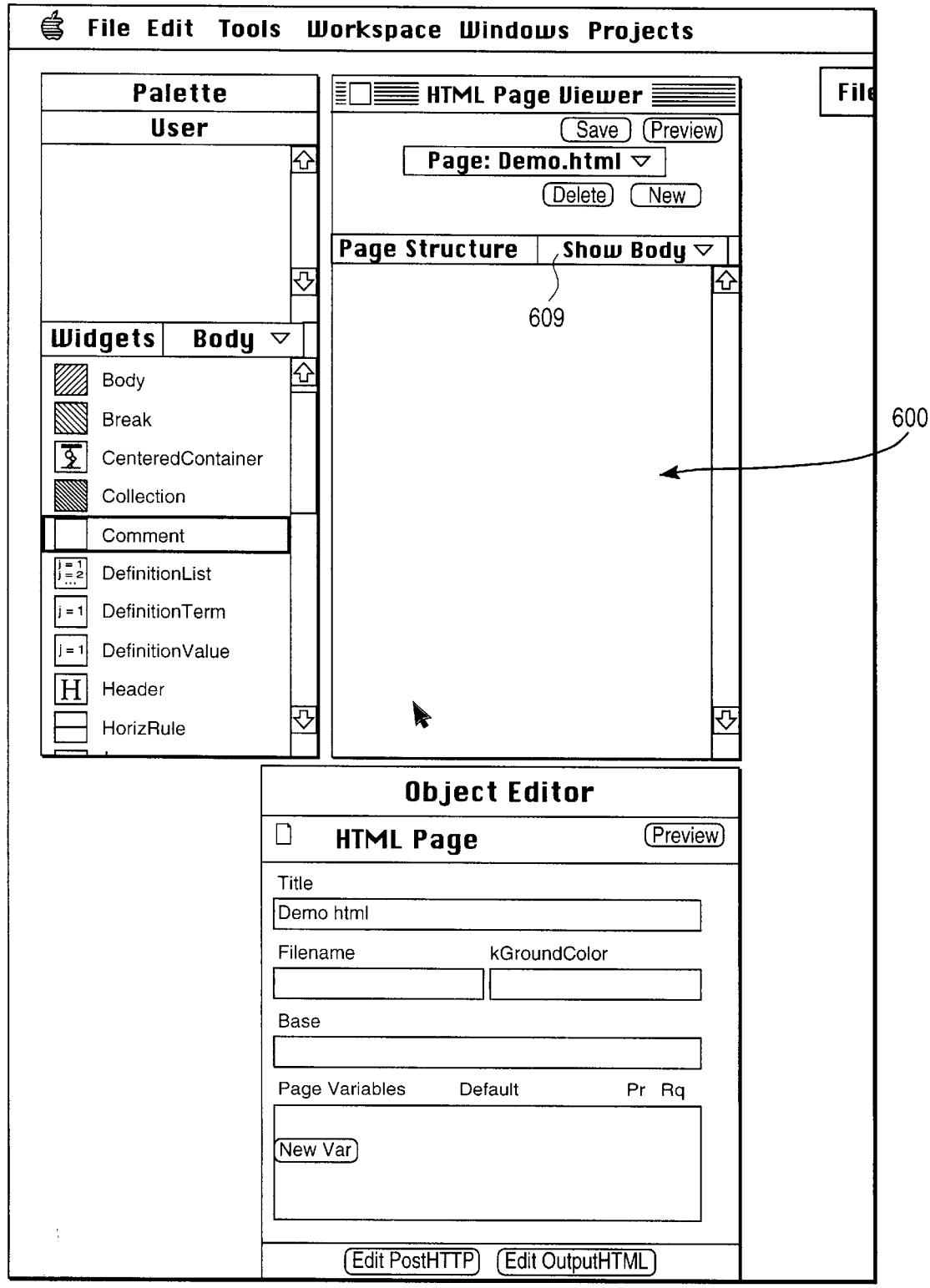
FIG. 6B illustrates a Web page viewer window as may be utilized by an embodiment of the present invention.

Page structure panel 608 displays a representation of a collection of objects from different segments of a Web page depending on what menu is selected from pull down menu 609. Page structure panel 608 can display a representation of a collection of objects from a Web page header segment, as illustrated in FIG. 6A, or a representation of a collection of objects from a Web page body segment, as illustrated in FIG. 6B. To switch between the header segment display and the body segment display in the page structure panel 608, a user pulls down on the pull down menu 609 at the top right corner of the page structure panel 608.

Having selected either a header or body Web page segment for display in the page structure panel 608, a user can create or modify an existing Web page by clicking on, i.e., selecting, and dragging the appropriate representation of HTML objects from the widgets panel 502 in the HTML Palette window 500 to the page structured panel 608 and dropping the representation of HTML objects therein. For example, with reference to FIG. 6C, a user can click on and drag a representation of the HTML object Header (at 620) and drop the representation of the HTML object Header in the body segment display of page structure panel 608 (at 621).

A user can also remove an object from the collection of objects comprising the Web page by using an input device to click on the representation of the object in the page structure panel 608 and pressing the delete key on the keyboard.

Object Editor Window

Figure 6C:
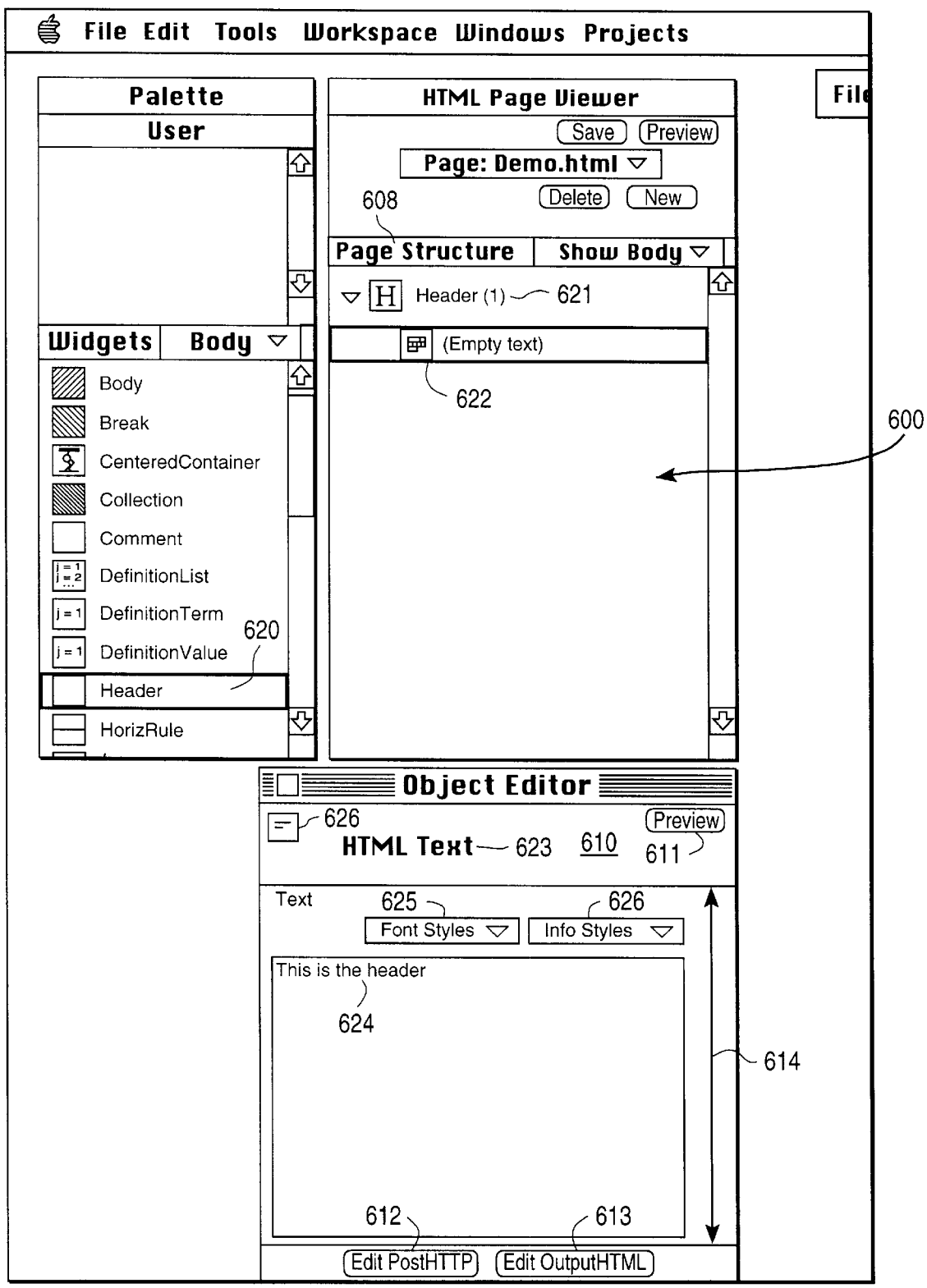
FIG. 6C illustrates an object editor window as may be utilized by an embodiment of the present invention.

With reference to FIG. 6C, the Object Editor window 610 allows the viewing and modification of objects. It displays all aspects of an object, including the properties associated with the object, property values, and handlers defined only by the object or its parent(s). Multiple Object Editor windows may be displayed on output display device 121. Additionally, multiple objects and their associated properties may be displayed in the Object Editor window at the same time, for example, by holding down the shift key on the keyboard while selecting objects with an input device such as a mouse to drag and drop the objects into the Object Editor window.

The Object Editor window, e.g., Object Editor window 610, is comprised of a object display panel in which an icon 626 representing the object and a corresponding name, e.g., HTMLText 623, representing the object, appears. Preview button 611 in the Object Editor window 610 demonstrates the object oriented nature of the present invention. For example, since a page, a paragraph, and a horizontal rule are all treated as objects, they share the same preview method. If, for example, a user is editing a table embedded in a complicated Web page, but wants to see just the table and not all the other items around it, the user can select the table and click on the Preview button 611 to preview just the table in a Web browser window. This functionality is inherited from the root HTML object and provides preview functionality to every HTML object created by the user.

The Object Editor window is further comprised of a properties display panel 614, via which a user is able to directly manipulate the properties associated with the object. The Edit PostHTTP button 612 and Edit OutputHTML button 613 within properties display panel 614 are provided for advanced users to write their own script methods on any object. A user can, for example, drag a horizontal rule into a document and then make the horizontal rule appear as a graphical image. The user would simply click on the rule, click on the Edit OutputHTML button and write a method that said something like, "if currentUser's fancyLayout is TRUE then return "<img src=fancyrule.gif>" else return do inherited." (This assumes currentUser is a global variable that has been previously set up with some sort of object describing the user looking at the page; and, requires the scripter to understand HTML to the extent necessary to create the 'img' tag). Because the horizontal rule object created in the first step is a new child of the root HorizontalRule object, the new behavior attaches only to the child. If the user wants to use the object again, the user drags the object into the user objects panel 501 and reuses it. The outputHTML button 613 is a handler that is used when the current Web page is requested by a remote user; a postHTTP handler can be used when the user fills out a form and "posts" the form results to the Web document (and therefore is useful for creating interactive pages).

Having selected an HTML object from either the user or widgets panel of the HTML Palette 500 for inclusion in the collection of objects comprising the current Web document in the page structure panel, a user can edit or modify the properties associated with the object via a context sensitive object editor window. For example, with reference to FIG. 6C, a user clicks on the representation of the HTML object HTMLText 622 in the page structure panel 608 of Viewer window 600. The user then drags the representation of the HTML object HTMLText 622 and drops it into Object Editor window 610. The object display panel shows an icon and an object name HTMLText 623 representing the HTML object. Furthermore, the properties display panel 614 provides access to the font styles 625, information styles 626 and text string 624 properties associated with the HTML object HTMLText. The user can manipulate any of these properties, as is illustrated by creating the text string "This is a header" in the property display panel.

Figure 6D:
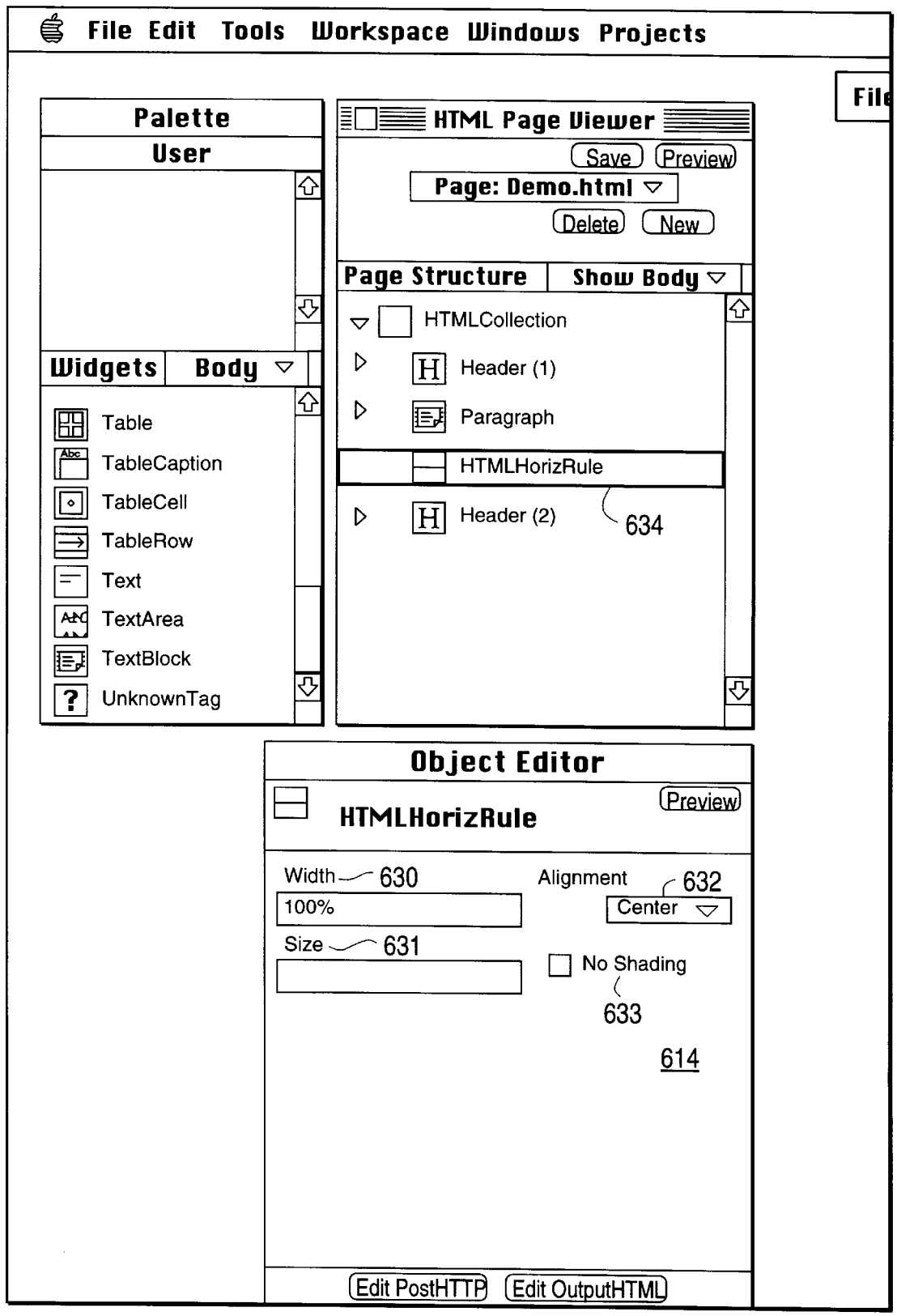
FIG. 6D illustrates an object editor window as may be utilized by an embodiment of the present invention.
Figure 6E:
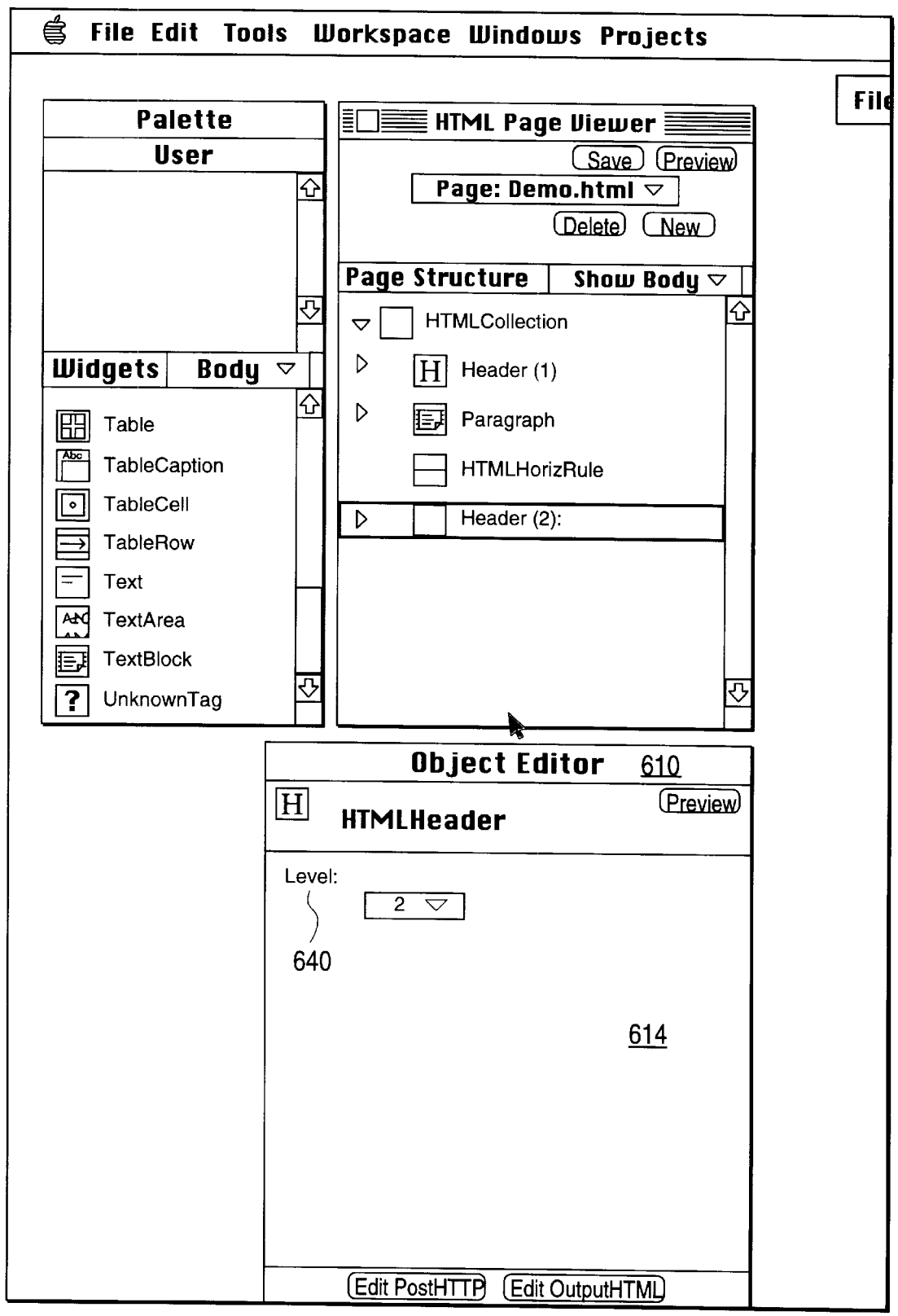
FIG. 6E illustrates an object editor window as may be utilized by an embodiment of the present invention.

As another example, with reference to FIG. 6D, a user clicks on a representation of the HTML object HTMLHorizRule 634 in the page structure panel 608. The user drags the representation and drops it into Object Editor window 610. The object display panel provides an icon and object name representing the HTML object HTMLHorizRule. The context sensitive nature of the properties display panel is apparent when comparing the properties display panel in FIG. 6C vis-a-vis the properties display panel in FIG. 6D. The properties display panel 614 in the latter case displays those properties associated with the HTML object HTMLHorizRule, namely, width 630, size 631, alignment 632 and the Boolean No Shading 633. FIG. 6E illustrates yet another example of the contextual nature of the object editor window, in which the property Level 640 is displayed in the properties display panel 614 for the associated HTML object HTMLHeader, selected and dropped into the object editor window from the page structure panel 608. The property value is 2, but may be modified to any value from one to six.

The concept of constrainment is illustrated by the pull down menus for the properties font styles 623 and information styles 626 in FIG. 6C, and alignment 632 (e.g., center, left, and right) in FIG. 6D, and Level 640 in FIG. 6E. A user is constrained as to the set of values from which to choose for each property.

In an alternative embodiment, a property value for an object is edited by double-clicking on the property or selecting the property and pressing the Return or Enter key. The properties display panel is replaced by a value editor panel for the particular property selected.

Additionally, a user can select an HTML object from either the user or widgets panel of the HTML palette and drag the object directly to an object editor window to directly manipulate the properties associated with the object via an object editor window.

Figure 7A:
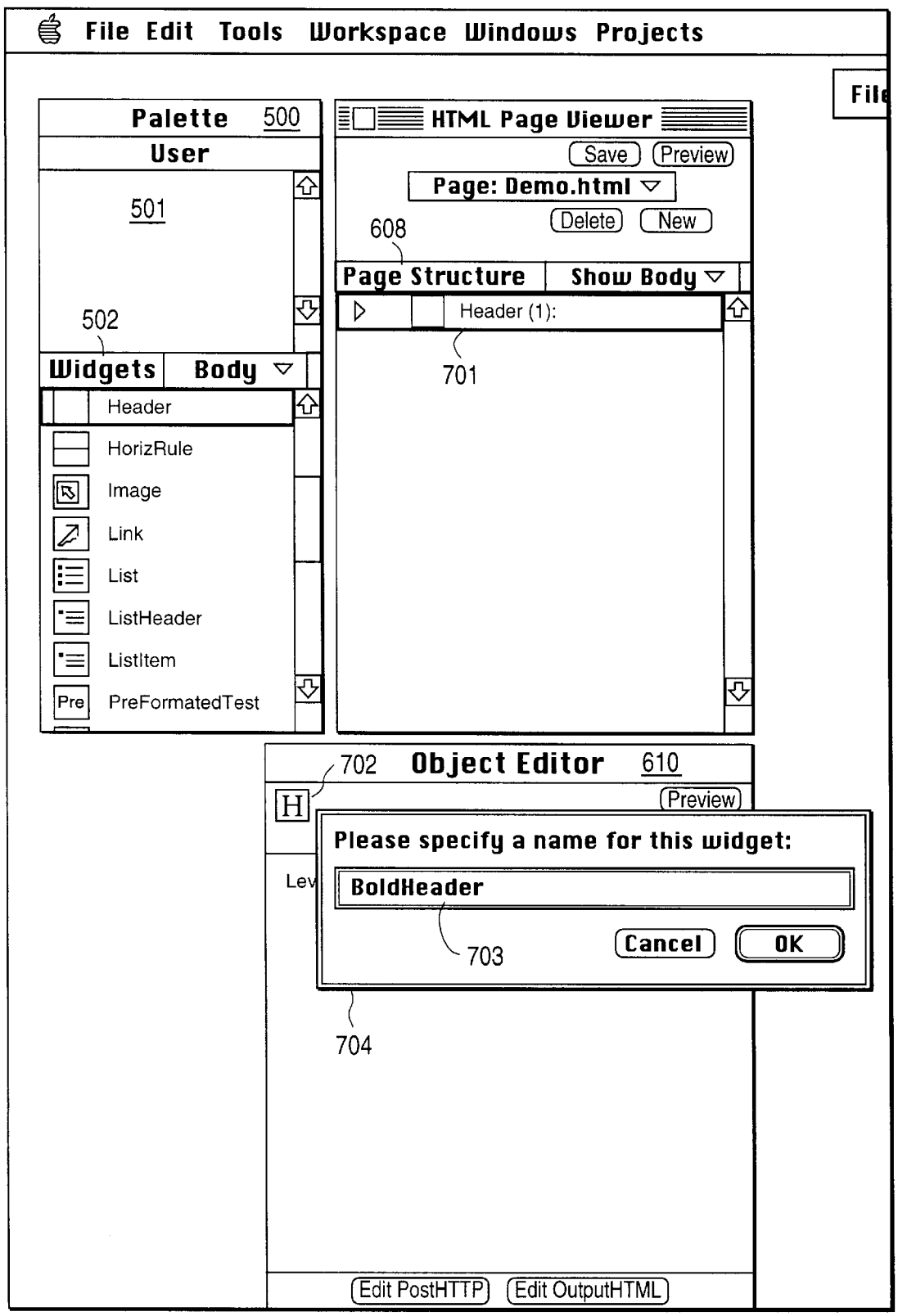
FIG. 7A illustrates a method for creating a user defined HTML object as may be utilized by an embodiment of the present invention.
Figure 7B:
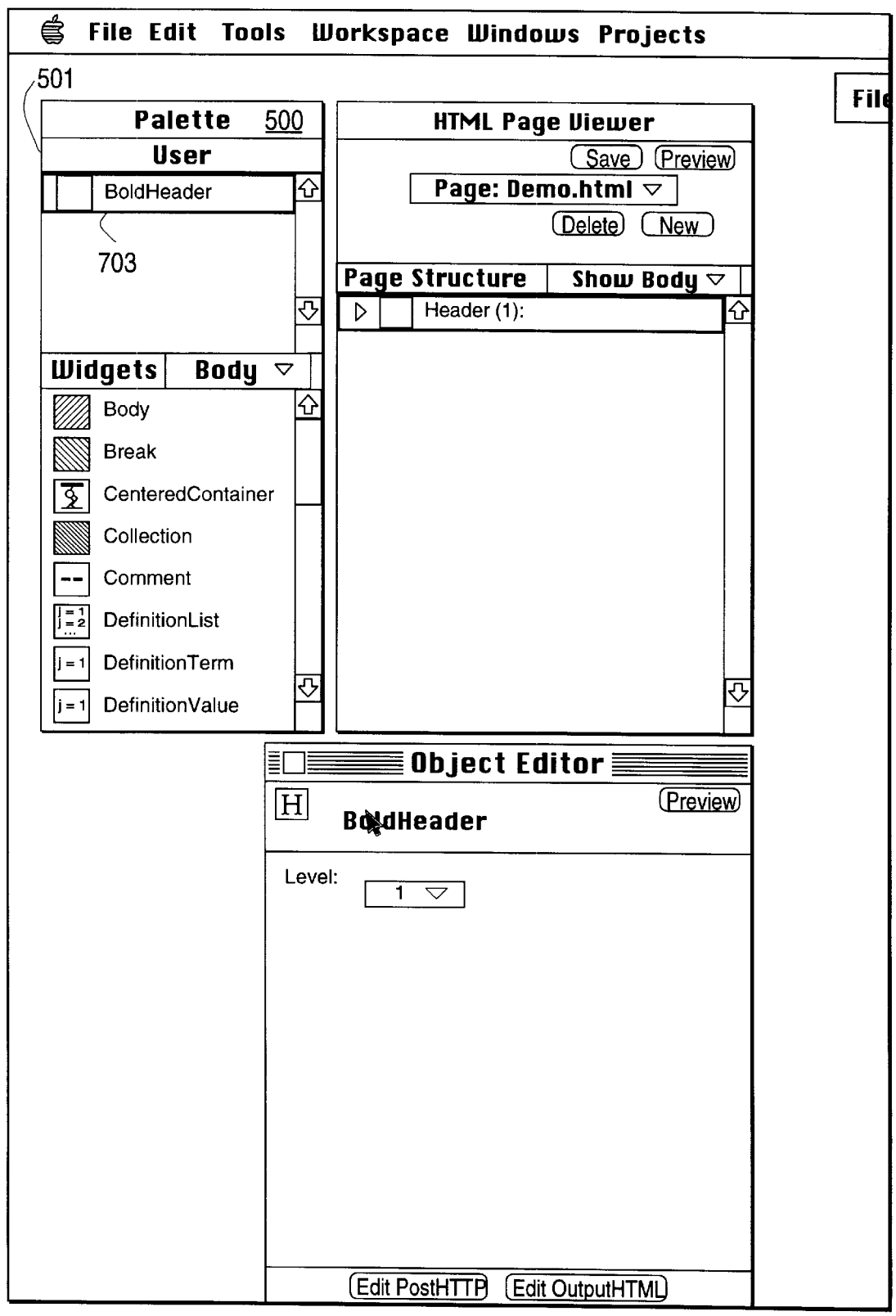
FIG. 7B illustrates a method for creating a user defined HTML object as may be utilized by an embodiment of the present invention.
Figure 8:
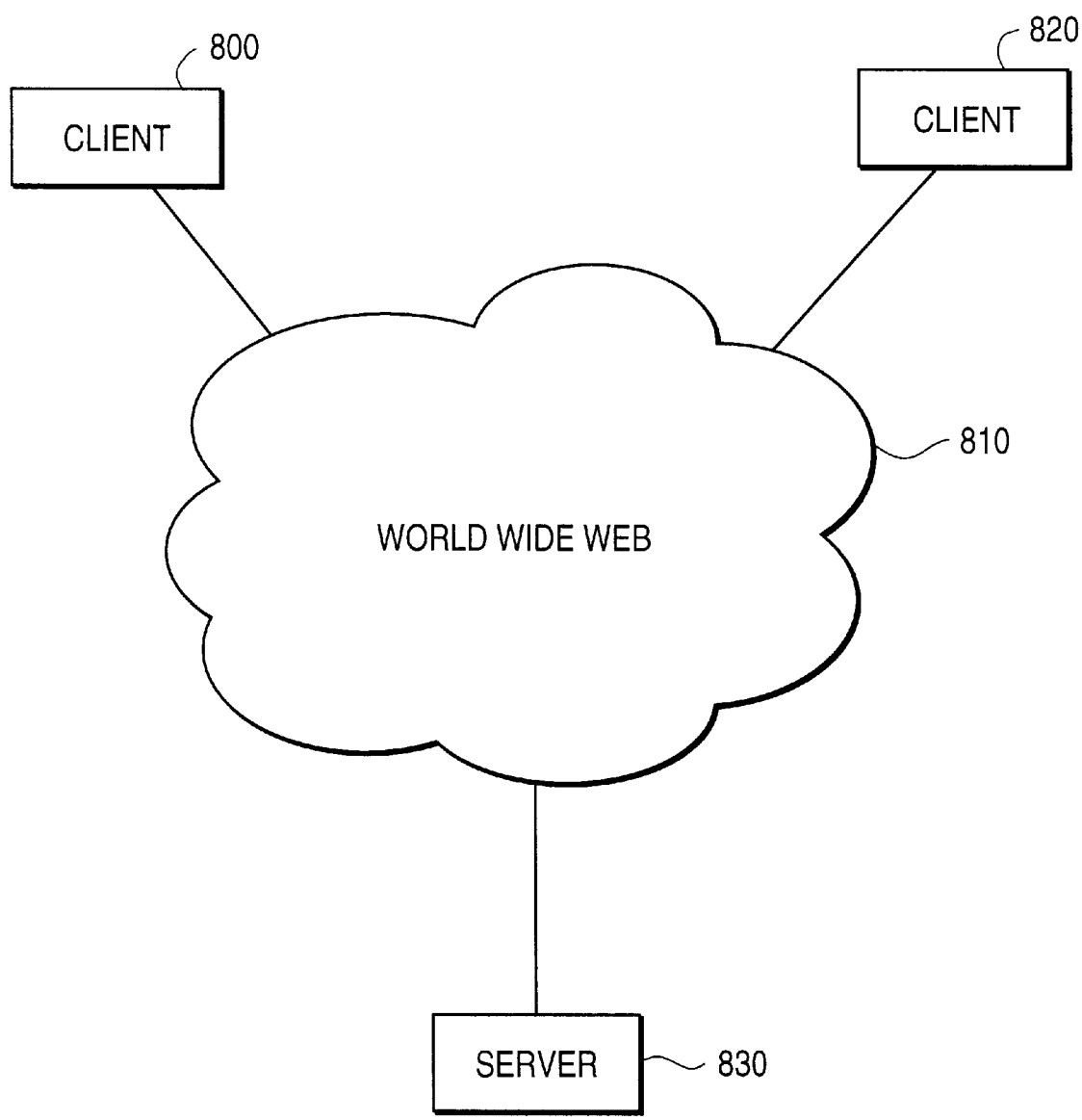
FIG. 8 illustrates a simplified model of the Internet's World Wide Web.
Figure 9:
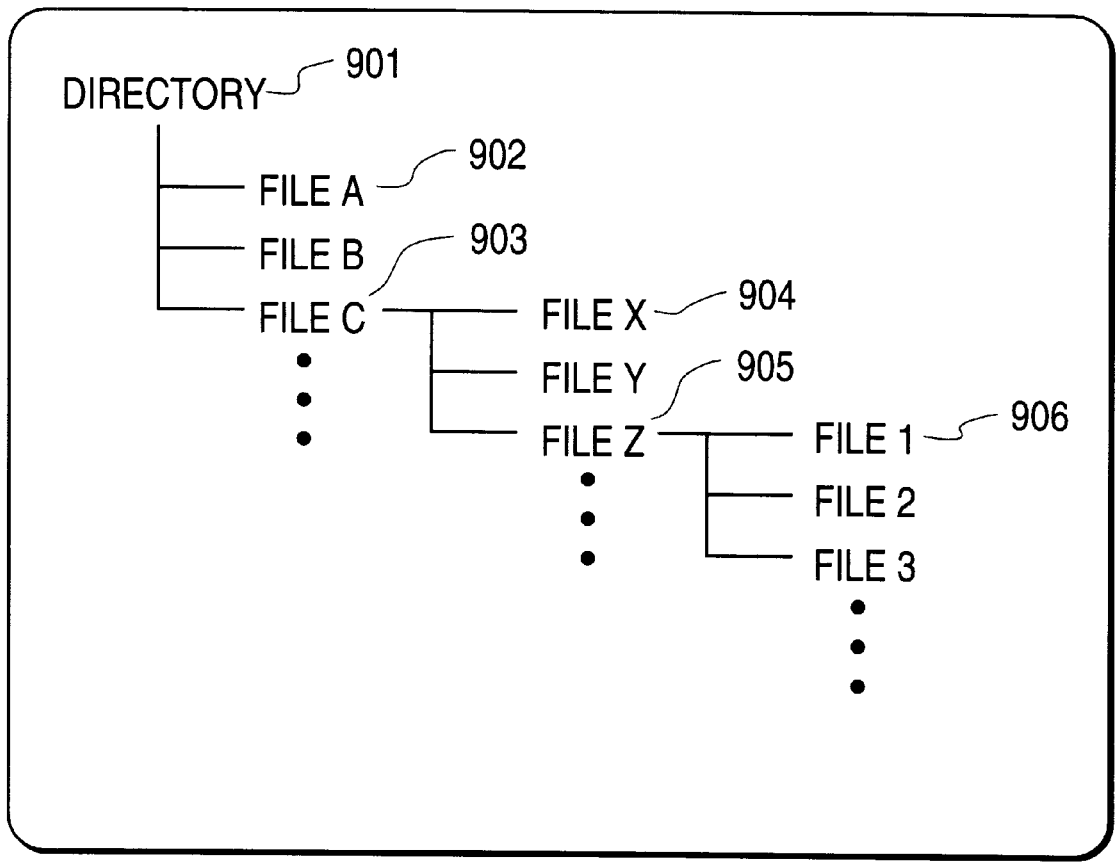
FIG. 9 illustrates the file system for a computer system as may be utilized by an embodiment of the present invention.

With reference to FIG. 7A, an object whose properties have been modified may be stored in user panel 501 of Palette window 500 for subsequent use in the collection of objects in a page opened in page structure panel 608. Storing in the user panel an object whose properties have been modified can be accomplished a number of ways. The user can click and drag a representation of an object, e.g., the representation 701 of HTML object Header from the page structure panel 608 to the user panel 501. If a property associated with the HTML object has been modified via the object editor window so that the object no longer is identical to the predefined object in the widgets panel 502, the user is prompted with a pop up window 704. The user types in a new name for the modified object, e.g., BoldHeader (at 703), in the pop up window and presses the Return or Enter key or selects the OK button. As illustrated in FIG. 7B, a representation of the modified object BoldHeader 703 then appears in the user panel 501 of the Palette window 500.

Alternatively, a user can select the icon or name representing an object in the object display panel of the object editor window and drag the representation to the user panel in the Palette window 500. As in the case where the user selects the representation of the object from the page structure panel, the user is prompted via a pop up window for a name for the object.

A direct manipulation editor for adding a property to a predefined HTML object is not provided. A property is added to an HTML object as follows. Suppose the HTML protocol changed and images could have a "translucent" property. To add the property, the user types (at the message box command line) syntax such as:

"insert {"translucent", "Is Translucent", checkbox} at end of objectPropertyList of HTMLImage"

The command adds a new entry with property name "translucent," user-interface description "Is Translucent", and type "checkbox" (other options include text, number, color, list, etc.) to the property list for HTMLImage. The object editor of the present invention would then reconfigure itself to display this new property, the outputHTML handler would correctly interpret it, and the parser would take note of it the next time the user attempted to load a Web page.

A description for creating a dynamic object, e.g., a timestamp based on the HTML object Header, follows. To create the dynamic object timestamp based on the HTML object Header, the user drags a new header into a page and set its level to 2 (i.e., a reasonably large, bold header). Then the user clicks on the "outputHTML" button in the object editor window for the object Header. A script editor window appears, into which the user types:

global theDate
   global theTime
   return theTime as string & "," & theDate as string The user then saves the changes and exits the script editor. To keep the new object, the user clicks on it and drags it to the user panel 501. An embodiment of the present invention then asks for a name, to which the user responds, for example, by typing "TimeStampObject." A dynamic, reusable timestamp object is now placed in the list of widgets in widgets panel 502. Note that while this is a fairly advanced example of creating a dynamic object, many useful compound objects can be created without any scripting at all, simply by compositing a set of useful objects into a container, as set forth in the example of "employeeInfo" above.

Publishing a Web Document

Figure 10:
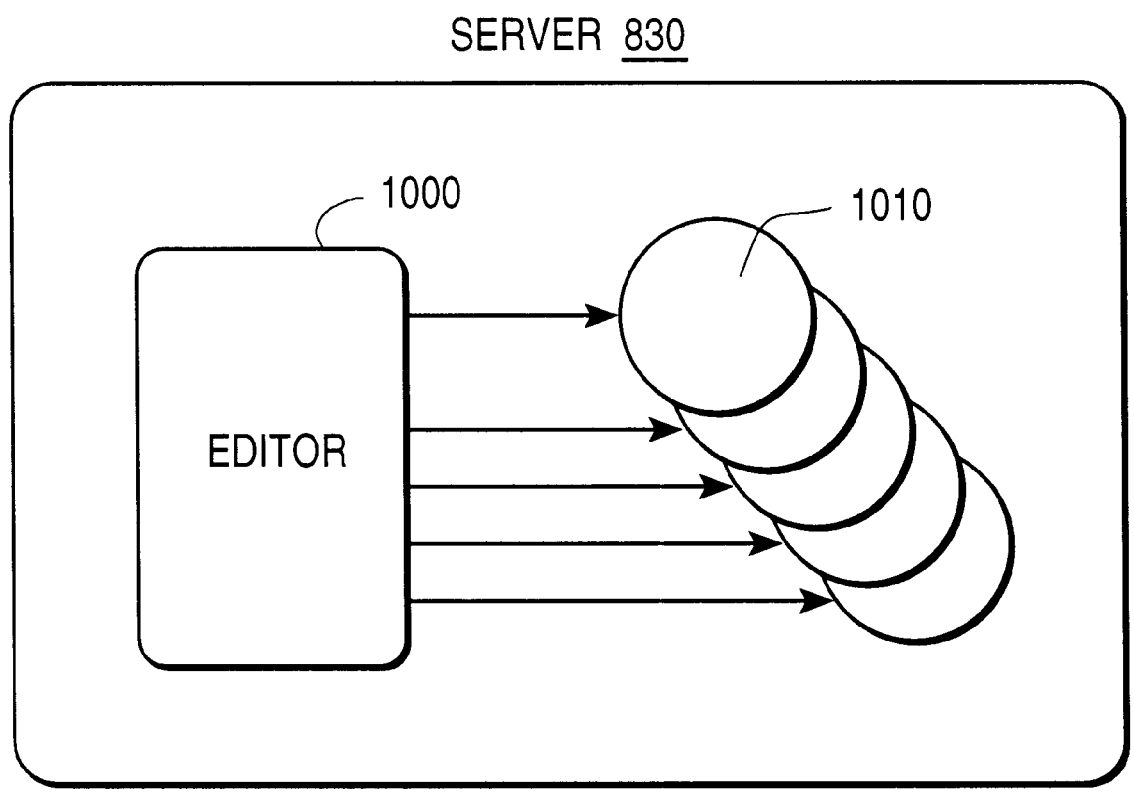
FIG. 10 is a diagram of an object system in which data objects are stored by an object oriented editor as may be embodied by the present invention.

An embodiment of the object oriented editor described above saves an HTML document as an object, rather than a data file. FIG. 10 illustrates object oriented editor 1000 on a server 830 saving Web documents as objects, such as object 1010. Recall from the above discussion that an object is itself a collection of objects.

The object comprising a Web document can be transferred by the server to a client over a data communications network. Alternatively, the object comprising the Web document can be executed by the server. The object, in turn, causes each object contained therein to execute and output a representation of the object in whatever format is requested by the client. For example, a client can send a request to the server over the data communications network. The requests specifies a particular Web document. The server searches it collection of objects in its object space for the object requested. The server, upon finding the object, and depending upon the nature of the client's request, will publish, i.e., transmit, the object as is to the client, or execute the object. The object outputs a representation of each object contained within the object in a format specified by the client. Thus, if the client requests an HTML formatted Web document, the server executes the object representing the Web document, passing as input to the object, an input argument indicating the output of each object within the Web document is to be formatted in HTML.

Figure 11:
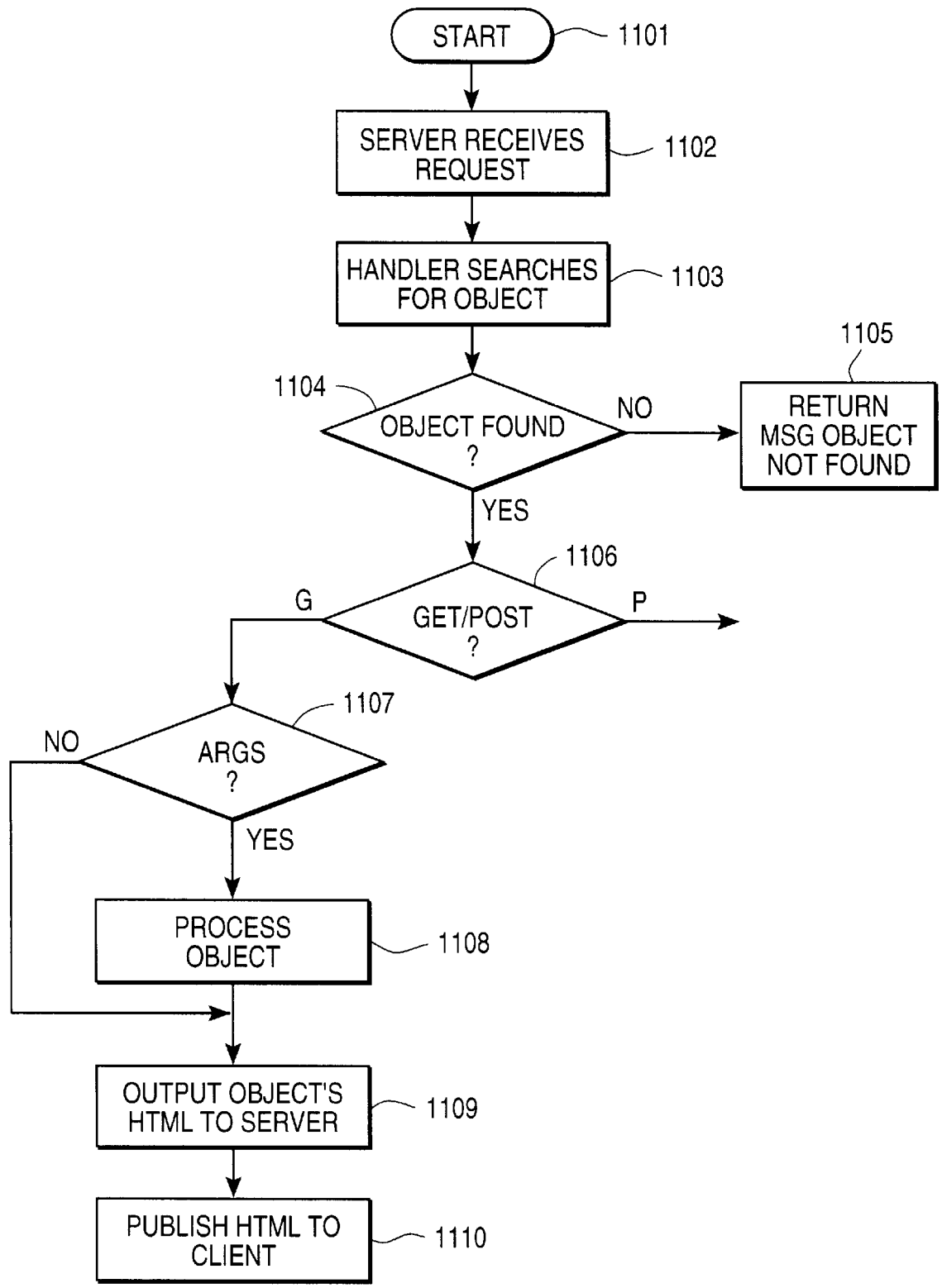
FIG. 11 is a flowchart of a method for publishing a Web document on the World Wide Web as may be embodied by the present invention.

With reference to FIG. 11, a method of publishing a Web document as embodied by the present invention is more fully explained. The process begins at step 1101 with the server and client having established an application-layer communication protocol connection. In the present embodiment, the client and server communicate with each other over a data communications network using HTTP. It is understood, of course, that other application-layer protocols may be used to establish and maintain appropriate communications between the client and server.

At step 1102, the server receives a request from a client over a data communications network. The request specifies an object, e.g., a Web document a user wants to display on the output display device coupled to the client. The request may also specify a property or a list of properties. A value or list of values may be assigned to the property or list or properties.

At step 1103, a handler for the root object Object searches in the object space on the server for the object specified by the client. At step 1104, a message is returned depending on whether the object specified by the client is found. If the object is not found, the handler, at step 1105, returns a message to the server that the object is not found. The server, in turn, communicates the message via the HTTP to the client. If, however, the object is found, the handler determines, at step 1106, whether a read (get) from or write (post) to the object is to be performed. Generally, publishing a Web document involves a read from the object representing the Web document, and so the flow chart continues to step 1107.

At step 1107, the object checks for the presence of input arguments, e.g., properties and values assigned to the properties. If arguments are present, At step 1108, the "outputHTML" handler of every object in the page is called in an pre-order traversal of the container hierarchy. If there exists, for example, a header object containing an image object and a text object, the handler would perform the following steps:

--- outputHTML the header (insert "<H1>" into stream)
   outputHTML the image (insert "<IMG attributes...>" into stream)
   finish outputHTML the image (no action)
   outputHTML the text (insert "...the text..." into stream)
   finish outputHTML the text (no action)
finish outputHTML the header (insert "</H1>" into stream)

---

When the process completes, the stream contains the entire Web page. The Web page can be used in any manner. For example, the Web page could be to the network to answer a remote request, saved to a temporary file on disk for use in a preview, or displayed to the user in a text buffer.

At step 1109, the handler outputs an HTML formatted representation of the object to the server. The last step, at 1110, is publishing, i.e., transmitting, the HTML formatted output the client.

In the foregoing specification, the invention has been described with reference to specific embodiments thereof. It will, however, be evident that various modifications may be made thereto without departing from the broader spirit and scope of the invention. The specification and drawings are, accordingly, to be regarded in an illustrative rather than a restrictive sense. The present invention is intended to be limited, therefore, only by the claims presented below.

What is claimed is:

1. A desktop publishing system, comprising:
   a) an output display device, said output display device displaying:
      1) a palette window comprising a user defined objects panel and a predefined objects panel, the user defined panel comprising a list of user defined objects and the predefined objects panel comprising a list of predined objects, and
      2) a view window displaying an page comprising at least one object selected from one of said list of user defined objects and said list of predined objects;
   b) an input device, said input device selecting said object from one of said list of user defined objects and said list of predefined objects for display in said page at said view window.

2. The desktop publishing system of claim 1, wherein said input device is a mouse.

3. The desktop publishing system of claim 1, wherein said input device is a keyboard.

4. The desktop publishing system of claim 1, wherein said output display device further displays an object editor window, said object editor window displaying a list of properties associated with said object selected from one of said list of user defined objects and said list of predefined objects.

5. In a desktop publishing system, a computer mediated method of generating and displaying a collection of objects representing a document, comprising:
   a) displaying a list of objects in a palette window on a display device, comprising:
      i) displaying a list of user defined objects in a user defined objects panel in said palette window;
      ii) displaying a list of predefined objects in a predefined objects panel in said palette window;
   b) receiving input from an input device selecting an object from one of said list of user defined objects and said list of predefined objects for said collection of objects;
   c) displaying said collection of objects in a page displayed in a view window of said display device, including said selected object.

6. The method of claim 5, wherein receiving input from an input device selecting an object from one of said list of user defined objects and said list of predefined objects for said collection of objects further comprises
   a mouse clicking on said object in said one of said list of user defined objects and said list of predefined.

7. The method of claim 5, further comprising:
   a) receiving input via said input device, said input selecting said object for modifying a property associated with said object;
   b) displaying in an object editor window in said display device a value of said property associated with said object;
   c) receiving at said input device input modifying said value of said property associated with said object.

8. The method of claim 7, wherein receiving input via said input device, said input selecting said object for modifying a property associated with said object includes receiving input via said input device, said input selecting said object from one of said list of user defined objects and said list of predefined objects in said palette window.

9. The method of claim 8 further comprising:
   a) receiving input selecting one of said objects from said lists of user defined objects and said predefined objects, said selected object having a property associated with said selected object, said property having a value identical to said modified value of said property associated with said selected object;
   b) displaying said selected object in said user defined objects panel in said palette window.

10. The method of claim 7, wherein receiving input via said input device, said input selecting said object for modifying a property associated with said object includes receiving input via said input device, said input selecting said object from said collection of objects in said page displayed in said view window of said display device.

11. The method of claim 10, wherein receiving at said input device input modifying said value of said property associated with said object further comprises displaying said object in said collection of objects in said page displayed in said view window of said display device.

12. The method of claim 6, wherein displaying said collection of objects in a page in a view window of said display device, including said selected object, comprises said mouse dragging said object from said one of said list of user defined objects and said list of predefined objects and dropping said object in said collection of objects in said page of said view window of said display device.

* * * * *